3,595,763
**PROCESS FOR THE PRODUCTION OF
FLUOROCHLOROPHOSGENE**
Peter Voss, Leverkusen, and Hans Niederprüm, Monheim, Germany, assignors to Farbenfabriken Bayer Aktiengesellschaft, Leverkusen, Germany
No Drawing. Filed Oct. 9, 1968, Ser. No. 766,299
Claims priority, application Germany, Oct. 18, 1967,
F 53,810
Int. Cl. B01k 3/00
U.S. Cl. 204—59                     4 Claims

ABSTRACT OF THE DISCLOSURE

Process for the production of carbonyl fluoride or carbonyl chlorofluoride by electrolyzing carbonyl dichloride or carbon monoxide optionally in the presence of carbonyl chloride, chlorine or chlorine donors in anhydrous hydrofluoride acid at a cell voltage of from 4 to 8 volts and at a temperature of from —20 to 20° C., the carbonyl fluoride or carbonyl chlorofluoride being removed from the reaction gases leaving the electrolysis cell by cooling.

---

This invention relates to a process for the production of fluorophosgene (carbonylfluoride) and fluorochlorophosgene (carbonylchlorofluoride) by the electrofluorination of phosgene or mixtures of carbon monoxide and chlorine, hydrogen chloride or compounds that give off chlorine. It is known that fluorophosgene can be obtained by reacting carbon monoxide with fluorine. To this end, it is possible to burn a mixture of carbon monoxide and fluorine or alternatively to pass the carbon monoxide over a fluorinating agent such as silver difluoride, mercury difluoride and so on.

Fluorochlorophosgene can be obtained by heating phosgene with antimony trifluoride for 1 to 2 hours at temperatures of from 135° C. to 150° C. and at elevated pressure in shaking-autoclaves (J. Am. Chem. Soc. 79 (1957), p. 5801; J. Chem. Soc. (1948), p. 2183).

According to the Swiss patent specification No. 390,889 fluorochlorophosgene may be obtained by slowly passing phosgene over arsenic trifluoride at temperatures in the range of from 40° C. to 45° C.

It has also been reported that the reaction of phosgene with hydrogen fluoride in a shaking-autoclave at a temperature of 80° C./20 atms. pressure gives fluorochlorophosgene in a yield of from 25% to 50% (J. Am. Chem. Soc. 68 (1946), p. 1672).

According to U.S. patent specification No. 2,757,213, the reaction either of phosgene or of a mixture of carbon monoxide and chlorine with hydrogen fluoride in the presence of active carbon and of a catalyst at elevated pressure leads to a number of products which in addition to fluorophosgene, contain chlorofluoromethanes and to a very limited extent fluorochlorophosgene.

It has also been reported by Rüdorff that Kwasnik obtained fluorophosgene by the reaction of chlorine-fluoride with excess carbon monoxide at —18° C. in yields of up to 90%, based on the chlorine fluoride used, however, by a slow reaction only (W. Klemm, Anorg. Chem., part 1, page 242).

A process for the production of fluorophosgene or fluorochlorophosgene by reacting hydrogen fluoride with phosgene or carbon monoxide, optionally in the presence of chlorine or compounds that give off chlorine, has now been found in which phosgene or carbon monoxide is electrolyzed, optionally in the presence of phosgene, chlorine or compounds that give off chlorine, in anhydrous hydrofluoric acid at a cell voltage of from 4 to 8 volts and at temperatures of from —20° C. to +20° C., the fluorophosgene or the chlorofluorophosgene being recovered by cooling from the reaction products leaving the electrolyzing cells.

It is possible in this way readily to obtain fluorophosgene and, in particular, fluorochlorophosgene also, on a commercial scale.

In the electrochemical fluorination of carbon monoxide, fluorophosgene is obtained in high yields in addition to the carbon monoxide used and secondary products such as carbon dioxide and fluorinated hydrocarbons. In the electrochemical fluorination of phosgene or mixtures of carbon monoxide and chlorine and/or phosgene and/or chlorine donors such as for example hydrogen chloride, pure fluorophosgene or mixtures of fluorophosgene with fluorochlorophosgene are formed, depending upon the operating conditions. The mixture may be separated by fractional distillation. Pure fluorochlorophosgene is preferentially obtained in cases where the electrolysis cells are charged with stoichiometric quantities of carbon monoxide and chlorine or hydrogen chloride or with phosgene appropriately diluted with carbon monoxide.

The process is preferably carried out in an electrolysis cell surmounted by a condenser in which the hydrogen fluoride escaping from the cell together with the reaction products is condensed and hence recycled. Where the cell is operated at normal pressure, electrolysis is preferably carried out at temperatures in the range of from about —5° C. to +8° C., whilst the condenser is operated at temperatures of from about —30° C. to —20° C. In some cases, the use of elevated temperatures involves the application of elevated pressures.

The process according to the invention is described by way of example below with reference to the production of fluorochlorophosgene:

Electrolysis was carried out in anhydrous hydrofluoric acid at a cell voltage of from 4 to 8 volts and a current density of 0.005 amp/cm.$^2$ in a 50-amp laboratory cell whose cell had been chemically nickel-plated and whose cathodes and anodes consisted of nickel. During electrolysis the temperature in the cell was kept at about 0° C., whilst the condenser connected to the cell operated at a temperature of from —30° C. to —20° C. Carbon monoxide and phosgene in a molar ratio of about 1:1 were introduced into the cell through a perforated screen beneath the anode/cathode block. Approximately 10 to 20 litres of the mixture were introduced per hour. Having passed through the condenser, the reaction gases formed were passed through an absorption tube filled with sodium fluoride tablets in order to remove any residual traces of hydrogen fluoride, and then through a reaction tube filled with antimony in order to remove the chlorine formed. A water-clear liquid was then condensed at —78° C., more than 90% of which consisted of COClF from which any phosgene and fluorophosgene still present were subsequently removed by fractional distillation.

The carbon monoxide/phosgene mixture may also be introduced into the cell through porous anodes, or alternatively is may be fed in directly at the surface of the hydrofluoric acid through suitable devices.

The purity of the fluorochlorophosgene may readily be adjusted to an optimum value in dependence upon the ratio in which the starting components are mixed, the method by which and the rate at which they are introduced, the reaction temperature and the temperature of the condenser.

In order to produce fluorochlorophosgene from carbon monoxide chlorine is not the only chlorine-donating starting component which may be used. It is also possible to use compounds of chlorine of the kind which split off the chlorine under the conditions of electrolysis but do not react with the anhydrous hydrofluoric acid at this stage. Accordingly, it is possible to use inorganic or organic chlorides of the kind which can be uniformly distributed in the hydrofluoric acid but which only give off chlorine under the influence of electrolysis, such as for example hydrogen chloride. Soluble salts, preferably alkali metal salts of hydrofluoric acid, may be added as electrolytes in an effective amount to the hydrofluoric acid, as a result of which the cell voltage may be lowered and the boiling point of the hydrofluoric acid may be increased. Preferably, the salts, e.g. NaF, $NaHF_2$; KF; $KHF_2$. LiF; $LiHF_2$ are added in an amount of 10 to 0.1 weight percent.

Fluorophosgene and fluorochlorophosgene are valuable starting materials for the production of fluorine-containing compounds. COClF reacts for example with mercaptans and thiophenols to form the corresponding fluoroformic acid thioesters:

$$RSH + ClCOF \rightarrow RSCOF + HCl$$

or with alcohols and phenols to form fluoroformic acid alkyl or aryl esters:

$$ROH + ClCOF \rightarrow ROCOF + HCl$$

or with primary or secondary aliphatic and aromatic amines to form the corresponding alkyl or aryl carbamylfluorides:

$$RNH_2 + ClCOF \rightarrow RNHCOF + HCl$$

$$R_2NH + ClCOF \rightarrow R_2NCOF + HCl$$

Fluoroformic acid t-butyl ester represents an interesting intermediate compound in the synthesis of polypeptides. The particular advantage of the t-butoxy carbonyl protective group for functional amino acids is that it can be readily split off again after the protected polypeptide chain has been completed.

The invention is illustrated by the following Examples:

EXAMPLE 1

An electrolysis cell holding 9.6 litres of anhydrous hydrofluoric acid was filled with approximately 150 ml. of phosgene. The solution was electrolyzed with direct current at a current intensity of 50 amps and an average cell voltage of 6.5 volts in the absence of an electrolyte. Gaseous phosgene was continuously fed in at the surface of the hydrofluoric acid in a quantity commensurate with the amount of COClF formed. The average cell temperature was 0° C. whilst that of the condenser amounted to −25° C. In order to remove the chlorine formed, the reaction gases were passed through a reaction tube filled with antimony and then condensed at −78° C. After 7 hours, approximately 70 ml. of a water-clear reaction product had been formed whose purity and composition were determined as follows by infra-red spectroscopy and gas chromatography:

| | Percent |
|---|---|
| COClF | 90.7 |
| $COCl_2$ | 5.7 |
| $COF_2$ | 3.6 |

EXAMPLE 2

The electrolysis cell was filled with 9.6 litres of anhydrous hydrofluoric acid, 220 ml. of phosgene and 80 g. of NaF.HF. The average cell voltage was 4.8 volts for a current intensity of 50 amps. The average cell temperature was 0° C., whilst the condenser was run at a temperature of −30° C. After 5.7 hours, 85 ml. of a reaction product with the following composition had been formed:

| | Percent |
|---|---|
| COClF | 90.1 |
| $COF_2$ | 6.5 |
| $COCl_2$ | 3.4 |

The total COClF yield amounted to approximately 85% (based on the $COCl_2$ used).

EXAMPLE 3

The electrolysis cell was filled with 9.6 litres of anhydrous hydrofluoric acid and 400 g. of phosgene.

Throughout the test run, a vigorous stream of phosgene was fed in beneath the electrode block through a finely perforated screen. The average cell temperature was 0° C., and the temperature of the condenser was −25° C. A cell voltage of 4.7 volts was determined for a current intensity of 50 amps. After 3.7 hours, the product yield amounted to 55 ml. The composition of the reaction product was as follows:

| | Percent |
|---|---|
| $COF_2$ | 42.0 |
| COC | 36.1 |
| $COCl_2$ Entrained | 21.9 |

EXAMPLE 4

The electrolysis cell was filled with 9.6 litres of anhydrous hydrofluoric acid but did not contain any electrolyte. Throughout the test run which lasted 14.25 hours, a $CO/Cl_2$ mixture was fed in through a perforated screen at a maximum throughout of 20 litres CO/hour and 7/10 litres $Cl_2$/hour. The cell temperature was approximately −5° C., whilst the temperature of the condenser was −25° C. The average current intensity amounted to 6.5 volts for a medium intensity of current of 50 amps.

The composition of the gas stream escaping overhead was found to be as follows:

| | Percent |
|---|---|
| $COF_2$ | 87.7 |
| COClF | 8.9 |
| $COCl_2$ | 3.3 |

EXAMPLE 5

The electrolysis cell was filled with 9.6 litres of anhydrous hydrofluoric acid and 50 g. of NaF as the electrolyte. A CO/HCl gas mixture was fed in beneath the electrode block through a perforated screen at a maximum rate of flow of 10 litres HCl/hour and 10 litres of CO/hour. The current intensity amounted to 50 amps for an average cell voltage of 5.0 volts. The cell temperature was −5° C., whilst the temperature of the condenser amounted to −25° C.

The composition of the gas mixture escaping overhead was determined by gas chromatography:

| | Percent |
|---|---|
| $COF_2$ | 81.4 |
| COClF | 10.3 |
| $COCl_2$ | 5.0 |

EXAMPLE 6

The electrolysis cell was filled with 9.6 litres of anhydrous hydrofluoric acid but did not contain any electrolyte. Throughout the test run which lasted 8.7 hours, a stream of carbon monoxide was introduced through a perforated screen at a rate of 10 litres per hour. The temperature of the cell was −5° C., and the temperature of the condenser was −25° C. The average cell voltage for a current intensity of 50 amps was 6.08 volts.

The composition of the reaction mixture was determined by infra-red spectroscopy: CO, $CO_2$, $C_nF_{2n+2}$, $C_nF_{2n+1}COF$, $COF_2$.

What is claimed is:
1. A process for producing carbonyl chlorofluoride which comprises electrolyzing phosgene in anhydrous hydrofluoric acid at a cell voltage of from 4 to 8 volts and at a temperature of about −20 to 20° C. and recovering resulting carbonyl chlorofluoride.
2. The process of claim 1 wherein said anhydrous hydrofluoric acid contains a soluble salt in an amount reducing the cell voltage and increasing the boiling point of said hydrofluoric acid.
3. The process of claim 2 wherein said soluble salt is present in an amount of from 10 to 0.1 weight percent.
4. The process of claim 2 wherein the soluble salt is an alkali metal fluoride.

References Cited
UNITED STATES PATENTS

| | | | |
|---|---|---|---|
| 2,519,983 | 8/1950 | Simons | 204—59 |
| 2,806,817 | 9/1957 | Wolfe | 204—59 |
| 3,461,050 | 8/1969 | Childs | 204—59 |

JOHN H. MACK, Primary Examiner

N. A. KAPLAN, Assistant Examiner